United States Patent
Raymond

(10) Patent No.: US 10,447,463 B2
(45) Date of Patent: Oct. 15, 2019

(54) DEVICE AND METHOD FOR ULTRA-LOW LATENCY COMMUNICATION

(71) Applicant: ORTHOGONE TECHNOLOGIES INC., Dorval (CA)

(72) Inventor: Alexandre Raymond, Blainville (CA)

(73) Assignee: ORTHOGONE TECHNOLOGIES INC., Dorval, Quebec (CA)

(*) Notice: Subject to any disclaimer, the term of this patent is extended or adjusted under 35 U.S.C. 154(b) by 0 days.

(21) Appl. No.: 16/035,489

(22) Filed: Jul. 13, 2018

(65) Prior Publication Data
US 2019/0020466 A1 Jan. 17, 2019

Related U.S. Application Data

(60) Provisional application No. 62/531,965, filed on Jul. 13, 2017.

(51) Int. Cl.
| | |
|---|---|
| *H04L 7/033* | (2006.01) |
| *H04B 10/2575* | (2013.01) |
| *H04B 10/29* | (2013.01) |
| *H04B 10/40* | (2013.01) |
| *H04L 7/00* | (2006.01) |

(52) U.S. Cl.
CPC ....... *H04L 7/033* (2013.01); *H04B 10/25752* (2013.01); *H04B 10/29* (2013.01); *H04B 10/40* (2013.01); *H04L 7/0075* (2013.01); *H04B 2210/006* (2013.01)

(58) Field of Classification Search
CPC .. H04B 10/25752; H04B 10/29; H04B 10/40; H04B 2210/006; H04L 7/033; H04L 7/0075

USPC ......................................................... 398/116
See application file for complete search history.

(56) References Cited

U.S. PATENT DOCUMENTS

| | | | |
|---|---|---|---|
| 7,688,106 B1 * | 3/2010 | Shumarayev .... | H03K 19/17744 326/38 |
| 7,728,625 B1 * | 6/2010 | Nechamkin ...... | H03K 19/17744 326/41 |
| 8,543,488 B2 | 9/2013 | Vinokour et al. | |
| 9,071,476 B2 | 6/2015 | Fox et al. | |
| 9,118,392 B2 | 8/2015 | Sundar et al. | |
| 9,379,846 B1 | 6/2016 | Poplack et al. | |

(Continued)

*Primary Examiner* — Dalzid E Singh
(74) *Attorney, Agent, or Firm* — Conley Rose, P.C.

(57) ABSTRACT

An ultra-low latency communication device includes a clock recovery module, a de-serializer module, an FPGA fabric and a serializer module. The clock recovery module receives an incoming electrical physical layer serial signal and recovers a recovered clock signal therefrom. The de-serializer module converts the incoming electrical physical layer serial signal to an incoming electrical physical layer parallel signal according to driving signals generated based on the recovered clock signal. The FPGA fabric processes the incoming electrical physical layer parallel signal to output an incoming data-link layer parallel signal, receives an outgoing data-link layer parallel signal generated based on electronic information contained in the incoming data-link layer parallel signal, and processes the outgoing data-link layer parallel signal to output an outgoing electrical physical layer parallel signal. The serializer module converts the outgoing electrical physical layer parallel signal to an outgoing electrical physical layer serial signal.

22 Claims, 3 Drawing Sheets

(56) References Cited

U.S. PATENT DOCUMENTS

| | | | | |
|---|---|---|---|---|
| 9,407,574 | B2* | 8/2016 | Johnson | H04L 7/0331 |
| 9,647,688 | B1 | 5/2017 | Poplack et al. | |
| 2003/0043432 | A1* | 3/2003 | Marmur | H04B 10/29 |
| | | | | 398/139 |
| 2013/0077959 | A1* | 3/2013 | Liu | H04J 3/1652 |
| | | | | 398/1 |
| 2015/0371327 | A1 | 12/2015 | Kohari et al. | |
| 2017/0070339 | A1* | 3/2017 | Kaneta | H04N 21/4342 |

* cited by examiner

DEVICE AND METHOD FOR ULTRA-LOW LATENCY COMMUNICATION

RELATED PATENT APPLICATION

This application claims priority to U.S. provisional patent application No. 62/531,965 filed on Jul. 13, 2017 by and titled "Device and Method for Ultra-Low Latency Communication," which is incorporated by reference.

TECHNICAL FIELD

The present disclosure generally relates to methods and devices for ultra-low latency communication.

BACKGROUND

Ultra-low latency communication is critical for various applications that depend on the round-trip time at which information is sent and returned. One application that has recently garnered interest for ultra-low latency is electronic trading. For example, some trading firms are now using FPGAs to improve throughput and latency performances of their trading equipment. To further improve speed, trading firms deploy their trading infrastructure directly into the financial exchange data centers.

It is well known that microwave and laser radio technologies are used to interconnect financial exchanges and electronic components within financial exchanges to provide lower latency. Optical fiber links are also used to interconnect financial exchanges and electronic components within financial exchanges. Data between financial exchange data centers and trading firms are generally sent and received over 1G, 10G, or 40G data links. The trading firms may also install their trading equipment directly within the financial exchange data center, which can also contribute to decreasing latency. The data links may be electrical, microwave, radio frequency, or optical fiber Ethernet links.

SUMMARY

According to one aspect, an ultra-low latency communication device includes a clock recovery module, a de-serializer module, an FPGA fabric and a serializer module. The clock recovery module receives an incoming electrical physical layer serial signal and recovers, from the incoming electrical physical layer serial signal, a recovered clock signal. The de-serializer module receives the incoming electrical physical layer serial signal and receiving-side driving signals generated based on the recovered clock signal, and converts, according to the receiving-side driving signals, the incoming electrical physical layer serial signal to an incoming electrical physical layer parallel signal. The FPGA fabric receives the incoming electrical physical layer parallel signal, processes the incoming electrical physical layer parallel signal to output an incoming data-link layer parallel signal, receives an outgoing data-link layer parallel signal generated based on electronic information contained in the incoming data-link layer parallel signal, and processes the outgoing data-link layer parallel signal to output an outgoing electrical physical layer parallel signal. The serializer module receives the outgoing electrical physical layer parallel signal and converts the outgoing electrical physical layer parallel signal to an outgoing electrical physical layer serial signal.

According to some example embodiments, an optical fiber transceiver converts an incoming optical signal to the incoming electrical physical layer serial signal and the de-serializer module receives the incoming electrical physical layer serial signal directly from the optical fiber transceiver.

According to some example embodiments, the incoming electrical physical layer serial signal received by the de-serializer module is unusable by the de-serializer module for driving the de-serializer module to convert the incoming electrical physical layer serial signal to the incoming electrical physical layer parallel signal.

According to some example embodiments, the clock recovery module carries out recovering the recovered clock signal in parallel with the de-serializer module carrying out converting the incoming electrical physical layer serial signal to the incoming electrical physical layer parallel signal.

According to some example embodiments, a latency contributed by the clock recovery module and the de-serializer module in a round-trip latency of the ultra-low latency communication device is substantially equal to a latency of the de-serializer module.

According to some example embodiments, the serializer module converts the outgoing electrical physical layer parallel signal according to transmitting-side driving signals generated independently of the recovered clock signal.

According to some example embodiments, the receiving-side driving signals are non-synchronized with the transmitting-side driving signals.

According to some example embodiments, the receiving-side driving signals and the transmitting-side driving signals have the same clock frequencies.

According to some example embodiments, the device further includes a prefabricated transceiver module implementing the clock recovery module and having an embedded de-serializer module.

According to some example embodiments, the clock recovery module and the embedded de-serializer module are implemented as a unitary clock and data recovery and de-serializer module within the prefabricated transceiver module, and wherein the unitary clock and data recovery and de-serializer module are used exclusively for recovering the recovered clock signal from the incoming electrical physical layer serial signal.

According to some example embodiments, the de-serializer module applies a de-serialization ratio when converting the incoming electrical physical layer serial signal being less than a minimum de-serialization ratio of the embedded de-serializer module of the prefabricated transceiver module.

According to some example embodiments, the prefabricated transceiver module is bypassed by the de-serializer module when converting the incoming electrical physical layer serial signal to an incoming electrical physical layer parallel signal.

According to some example embodiments, the de-serializer module converting the incoming electrical physical layer serial signal is a standalone module.

According to some example embodiments, the serializer module applies a serialization ratio equivalent to the de-serialization ratio applied by the de-serializer module.

According to some example embodiments, the transmitting side of the communication device is free of a prefabricated transceiver.

According to some example embodiments, the device further includes an FPGA, the prefabricated transceiver is instantiated as a hard macro on the FPGA, and the FPGA fabric is implemented on the FPGA.

According to some example embodiments, the FPGA fabric comprises a receiving-side PCS module and a receiving-side MAC module, each being driven by a driving signal having a frequency determined according to a data rate of the incoming electrical physical layer serial signal and a de-serialization ratio applied at the de-serializer module.

According to another aspect, a method for ultra-low latency communication includes receiving an incoming electrical physical layer serial signal; recovering, from the incoming electrical physical layer serial signal, a recovered clock signal; generating receiving-side driving signals based on the recovered clock signal; converting, according to the receiving-side driving signals, the incoming electrical physical layer serial signal to an incoming electrical physical layer parallel signal, the converting of the incoming electrical physical layer serial signal being carried out in parallel with the recovering of the recovered clock signal; processing the incoming electrical physical layer parallel signal to output an incoming data-link layer parallel signal; receiving an outgoing data-link layer parallel signal generated based on electronic information contained in the incoming data-link layer parallel signal; processing the outgoing data-link layer parallel signal to output an outgoing electrical physical layer parallel signal; and converting the outgoing electrical physical layer parallel signal to an outgoing electrical physical layer serial signal.

According to some example embodiments, recovering the recovered clock signal is carried out using a clock recovery module implemented on a prefabricated transceiver module that also implements an embedded de-serializer module and converting the incoming electrical physical layer serial signal to the incoming electrical physical layer parallel signal is carried out using a de-serializer module being discrete from the prefabricated transceiver module and the converting bypasses the prefabricated transceiver module.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

Figure 1:
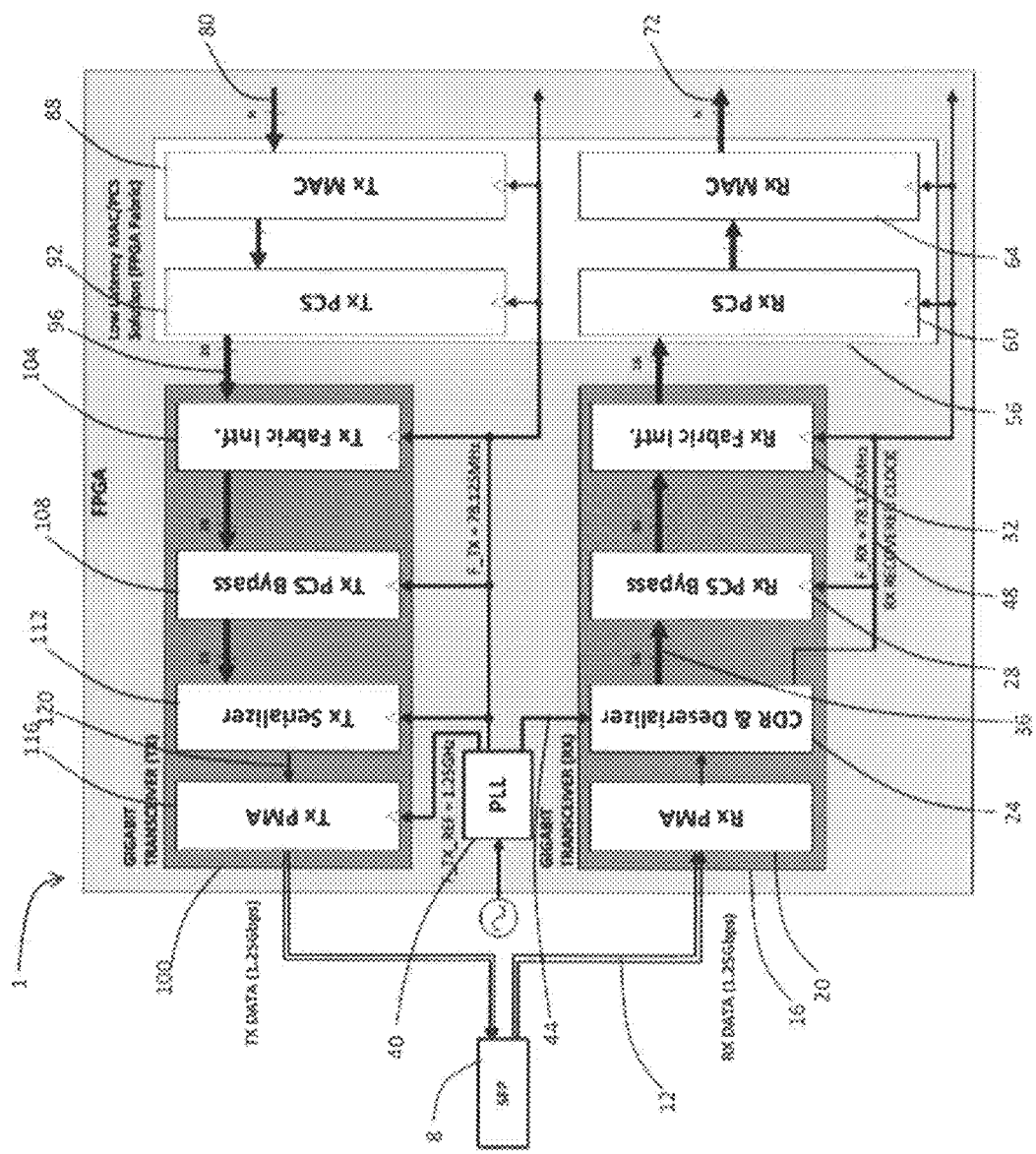
FIG. 1 is a schematic diagram of an ultra-low latency communication device implemented using prefabricated transceivers.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures, and components have not been described in detail so as not to obscure the embodiments described herein. Furthermore, this description is not to be considered as limiting the scope of the embodiments described herein in any way but rather as merely describing the implementation of the various embodiments described herein.

The following abbreviations apply:
ASIC: application-specific integrated circuit
CDR: clock and data recovery
CML: current-mode logic
CPU: central processing unit
DC: direct current
DSP: digital signal processor
EO: electrical-to-optical
FPGA: field-programmable gate array
G, Gb/s: gigabit(s) per second
IEEE: Institute of Electrical and Electronics Engineers
LVDS: low-voltage differential signaling
MAC: medium access control
Mb/s: megabit(s) per second
MHz: megahertz
NRZ: non-return-to-zero
ns: nanosecond(s)
OE: optical-to-electrical
OSI: Open Systems Interconnection
PCS: physical coding sublayer
PLL: phase-locked loop
PMA: physical medium attachment
ps: picosecond(s)
RAM: random-access memory
RF: radio frequency
ROM: read-only memory
RX: receiver/receiver unit
SerDes: serializer/de-serializer
SFP: small form-factor pluggable
SRAM: static RAM
TCAM: ternary content-addressable memory
TX: transmitter/transmitter unit
UI: unit interface(s).

Broadly described, various embodiments presented herein pertain to an ultra-low latency communication device and method in which prefabricated transceivers used to process incoming and outgoing physical layer signals are replaced by low-latency serializer/de-serializer modules. The serializer/de-serializer modules may apply serialization/de-serialization ratios that are lower than the minimum serialization/de-serialization ratios achievable by the prefabricated transceivers.

"Incoming signals" herein refer to signals processed on the receiving side of an ultra-low-latency communication device. The incoming signals travel in a direction away from the source of the electronic information. For example, in the context of financial trading data, the source of the electronic information may be the financial exchange and the incoming signals are signals transmitted, and travelling away, from the financial exchange.

"Outgoing signals" herein refer to signals processed on the transmitting-side of an ultra-low latency communication device. The outgoing signals travel in a direction towards the source of the electronic information. For example, in the context of financial trading data, the outgoing signals are transmitted towards the financial exchange.

Physical layer signals herein refer to signals that are represented in a state defined by electrical and physical specifications of the data connection and that are conceptualized as belonging to layer 1 of the OSI model.

Within an optical fiber data link, optical to electrical conversion is carried out at an endpoint of the link. The endpoint refers to equipment, such as hardware devices, where electronic information (e.g., financial trading data) transmitted over the data link is to be logically processed (e.g., applying financial trading algorithms). After the processing, electrical to optical conversion may also be carried out so that processed electronic information may be transmitted from the endpoint.

The conversion of optical signals to electrical signals and/or electrical signals to optical signals is carried out by optical fiber transceivers. These are most often implemented as user-swappable modules in SFP form.

SFP modules include components performing optical to electrical or electrical to optical conversion. The electrical side of the SFP module outputs (or receives) an electrical physical layer signal. The electrical physical layer signal is a physical representation of the transmitted electronic information, but requires further signal treatment in order to retrieve the transmitted electronic information. Since the electronic data is transmitted over an optical link, the electrical physical layer signal outputted by, or inputted to the SFP module is an electrical physical layer serial signal.

The electrical side of the SFP can be connected directly to an electrical transceiver, which performs the signal treatment of the incoming electrical physical layer serial signal so that a downstream component, when receiving electronic information over the optical fiber link, can process the electronic information represented in the physical layer electrical signal.

Multiple physical layer standards are defined for Gigabit Ethernet using optical fiber. The IEEE 802.3z standard includes 1000BASE-SX for transmission over multi-mode fiber, and 1000BASE-LX for transmission over single-mode fiber. These standards use 8b/10b encoding, which inflates the line rate by 25%, (from 1000 Mb/s to 1250 Mb/s for a 1G connection), to ensure a DC balanced signal. The symbols are then sent using NRZ.

Similarly, when transmitting data over the optical fiber link, the electrical transceiver performs the signal treatment of the electronic information to output an outgoing electrical physical layer signal that can be converted to an optical signal at the SFP.

For gigabit links (e.g., 1G, 10G, 40G, etc.), the electrical transceiver is commonly called a gigabit transceiver.

In various implementations commonly known in the art, the electrical transceiver is implemented as a hard macro instantiated into a FPGA. The electrical transceiver implemented as a hard macro may be a prefabricated component that may be purchased in a form that is ready for use (e.g., to be embedded) within an FPGA. Examples of commercially available prefabricated hard macro suitable for use as an electrical transceiver include the UltraScale™ GTY from Xilinx™.

The prefabricated hard macro used as an electrical transceiver is capable of performing various treatments of the incoming electrical physical layer serial signal, such as data de-serialization, encoding, decoding, equalization, clock and data recovery, etc. Various additional signal treatment or processing functionalities are often included in the prefabricated hard macro. The electrical transceiver outputs an incoming electrical physical layer parallel signal, which is a de-serialized version of the incoming electrical physical layer serial signal. The prefabricated electrical transceiver can be configured to perform de-serialization at different ratios, has internal data buses of varying width and can output the electrical physical layer parallel signal at these different bit-widths. However, a minimum de-serialization ratio is defined, thereby also defining a minimum bit-width of the outputted parallel signal. For example, the UltraScale™ GTY from Xilinx™ has internal data buses of 16, 20, 32, 40 or 64 bits, with a minimum bit-width of 16 bits and a minimum de-serialization ratio of 1:16.

The FGPA-implemented ultra-low latency communication device further includes a FPGA fabric which receives the incoming electrical physical layer parallel signal outputted from the electrical transceiver. The FPGA fabric is configured to provide further processing of the incoming electrical physical layer parallel signal according to specifications of an effective network protocol (e.g., Ethernet standard). The FPGA fabric outputs an incoming data-link layer parallel signal that contains electronic information (e.g., containing electronic trading information). This signal may be further received at a downstream computing unit that implements application-specific algorithms (e.g., electronic trading algorithms) based on the electronic information.

FIG. 1 is a schematic diagram of the components of an FPGA-implemented ultra-low latency communication device 1 that includes one or more prefabricated electrical transceivers implemented as hard macros instantiated into the FPGA.

An SFP 8 forms the interface between the optical fiber and the FPGA-implemented ultra-low latency communication device 1. When receiving electronic information, an incoming electrical physical layer serial signal 12 is outputted from the SFP 8. It will be appreciated that the SFP 8 converts the incoming optical signal to the incoming electrical physical layer serial signal 12.

A receiving-side prefabricated transceiver 16 receives the incoming electrical physical layer serial signal 12. In a least-latency path within the receiving-side prefabricated transceiver 16, the incoming electrical physical layer serial signal 12 is sequentially processed by a receiving-side PMA module interface 20, a clock and data recovery and de-serializer module 24, a PCS bypass module 28 and a fabric interface module 32. These modules are embedded within the prefabricated transceiver. The physical medium attachment module interface 20 carries out a first conversion of the incoming electrical physical layer serial signal 12.

This converted serial signal is received at the clock and data recovery and de-serializer module 24, which recovers a synchronizing clock sub-signal in the converted signal and further converts the serial signal to an incoming electrical physical layer parallel signal 36. The clock and data recovery and de-serializer module 24 is driven by a phase lock-loop 40 of the communication device 1 and outputs a recovered clock signal 48. The driving clock signal 44 from the phase lock-loop 40 defines the nominal frequency at which each bit of the converted incoming electrical physical layer serial signal 12 is retrieved. This nominal frequency can be equal to the data rate of the incoming electrical physical layer serial signal 12. The recovered clock signal 48 is a fraction of the driving clock signal 44 corresponding to the de-serialization ratio applied by the de-serializer portion of the clock and data recovery and de-serializer module 24.

In the illustrated example, the driving clock signal 44 has a frequency of 1.25 GHz and the clock and data recovery and de-serializer module 24 applies a de-serialization ratio of 1:16. Accordingly, the recovered clock signal 48 has a frequency of 78.125 MHz.

The clock and data recovery and de-serializer module 24 outputs the incoming electrical physical layer parallel signal 36. In the illustrated example, since a de-serialization ratio of 1:16 was applied, the incoming electrical physical layer parallel signal 36 is a 16-bit signal. Processing of the incoming electrical physical layer parallel signal 36 on the receiving side downstream of the clock and data recovery and de-serializer module 24 is carried out according to the frequency of the recovered clock signal 48.

After passing through the PCS bypass module 28 and the fabric interface module 32, the incoming electrical physical layer parallel signal 36 is received at a FPGA fabric 56 of the communication device 1. The FPGA fabric 56 processes the incoming electrical physical layer parallel signal 36 according to specifications of the effective network protocol (e.g., Ethernet standards). For example, and as illustrated, the FPGA fabric 56 includes a receiving-side PCS module 60 that applies physical coding sublayer processing according to Ethernet standards. The FPGA fabric 56 further includes a receiving-side MAC module 64 that provides interfacing of the FPGA fabric 56 with a multiple access network. The FPGA fabric 56 outputs a data-link layer parallel signal 72 containing the electronic information, which may be further received and processed at a downstream computing unit implementing application-specific algorithms (e.g., electronic trading algorithms). The computing unit may be external to the ultra-low latency communication device 1, such as a workstation or server. Alternatively, the computing unit may be implemented within the FPGA fabric 56.

The transmitting side of the ultra-low latency communication device 1 substantially mirrors its receiving side. The FPGA fabric 56 receives outgoing electronic information signal 80 from the computing unit. The transmitted electronic information signal 80 may be in the form of an outgoing data-link layer parallel signal 72. The outgoing electronic information signal 80 is processed at a transmitting-side MAC module 88 and a transmitting-side PCS module 92. An outgoing electrical physical layer parallel signal 96 outputted from the FPGA fabric 56 further passes through a transmission-side fabric interface module 104 and transmission-side PCS bypass module 108 of a transmission-side transceiver 100. As illustrated, the transmission-side transceiver 100 is also a prefabricated transceiver, and can have the same specifications as the receiving-side transceiver 16. A transmission-side serializer module 112 of the transmission-side prefabricated transceiver 100 converts the outgoing electrical physical layer parallel signal 96 to an outgoing physical layer serial signal. A transmission-side PMA interface module 116 provides a transmission side conversion to the outgoing physical layer serial signal 120. The signal outputted from the PMA interface module 116 is ready for conversion by the SFP 8, to be further transmitted over the optical fiber link as an outgoing optical signal. Various modules of the transmission-side transceiver 100 may also be driven by clock signals outputted by the phase-lock loop 40.

It was observed that the round trip latency of the ultra-low latency communication device 1 using prefabricated transceivers (the time elapsed between when the incoming electrical physical layer serial signal 12 is outputted from the SFP 8 and when the outgoing electrical physical layer serial signal 120 is received at the SFP 8) includes the latency of the receiving-side transceiver 16, the receiving-side of the FPGA fabric 56, the transmitting side of the FPGA fabric 56 and the latency of the transmitting-side transceiver 100. Furthermore, since the receiving-side transceiver 16 and transmitting-side transceiver 100 mirror one another, a round-trip latency can be defined for the prefabricated transceivers 16, 100, which is an aggregation of the latency of both transceivers. This round-trip latency depends on the selected internal data bus width (the serialization ratio applied) and the various functional modules that are enabled. The example illustrated in FIG. 1 shows the minimum set of functional modules that need to be enabled. A minimum round-trip latency can be achieved by selecting a serialization ratio that provides the lowest latency and by enabling the minimum set of modules of the transceivers 16, 100.

For the ultra-low latency communication device 1 illustrated in FIG. 1, it was observed that latency is introduced in the receiving-side transceiver 16 by the PMA module 20, the clock and data recovery and de-serializer module 24, passing through the PCS Bypass module 28, and passing through the fabric interface module 32. A similar amount of latency is introduced in the transmission-side transceiver 100.

For one particular model of the Xilinx UltraScale™ GTY transceiver, a minimum round-trip latency is 163.5 UI. One UI corresponds to one period of the driving clock signal 44 (e.g., 800 ps for a clock frequency of 1.25 Gb/s). This results in a minimum round-trip latency of the GTY transceiver of 130.8 ns. This minimum round-trip latency is obtained when the minimum set of modules of the transceiver are enabled and the de-serialization/serialization ratio is set at the minimum data width of the transceiver (i.e. the minimum serialization ratio). For example, for the Xilinx UltraScale™ GTY transceiver, the minimum data width is 16 bits.

Within the illustrated ultra-low latency communication device 1, latency is also introduced in the FPGA fabric 56. The processing carried out at the receiving-side PCS module 60, receiving-side MAC module 64, transmission-side MAC module 88 and transmission-side PCS module 92 all introduce additional latency. The latency of modules 60, 64, 88 and 92 is a function of the period of one clock cycle of the recovered clock signal 48 driving these modules. In the illustrated example, each of the modules 60, 64, 88 and 92 are driven by the recovered clock signal 48 having a clock period of 12.8 ns (for a clock frequency of 78.125 MHz).

Latency at the modules 60, 64, 88 and 92 can be reduced by driving them using a faster clock (e.g., 250 MHz to 350 MHz, giving clock cycle periods of 2.86 ns to 4 ns) having a shorter period. This would require another clock signal, which would also require a clock rate conversion. Such a conversion is undesirable for low-latency applications because it introduces another source of latency. Accordingly, it was observed that the latency introduced at the FPGA fabric 56 is a function of the speed of the driving clock signal 44 and the serialization ratio applied at the clock and data recovery and de-serializer module 24.

For example, for the illustrated ultra-low latency communication device 1 of FIG. 1, a total-round trip latency of approximately 200 ns can be obtained (including the round-trip latency of 130.8 ns introduced in the Xilinx UltraScale™ GTY transceiver).

Figure 2:
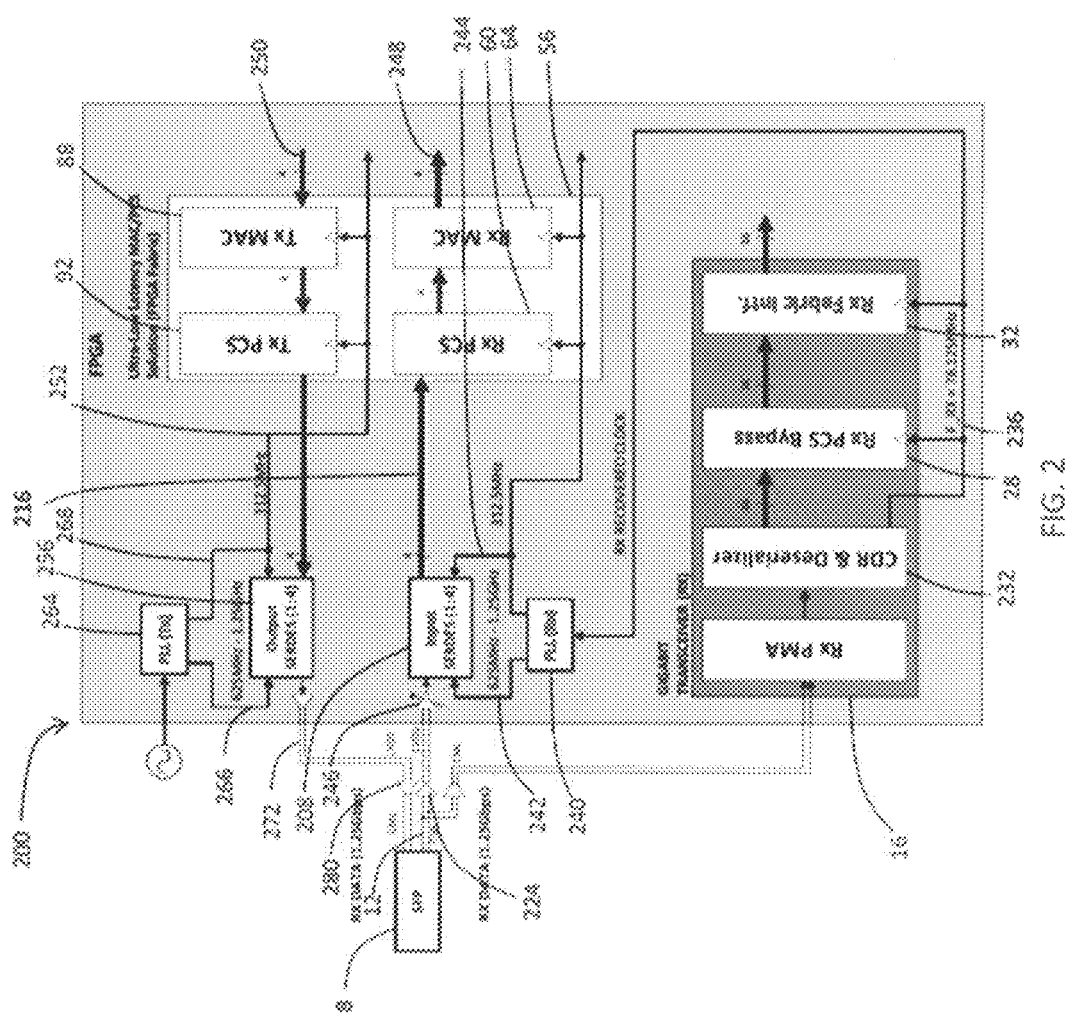
FIG. 2 is a schematic diagram of an improved ultra-low latency communication device according to one example embodiment.

FIG. 2 is a schematic diagram of an improved ultra-low latency communication device 200 according to one example embodiment.

The SFP 8 forms the interface between the optical fiber and the improved FPGA-implemented ultra-low latency communication device 200. When receiving electronic information, an incoming electrical physical layer serial signal 12 is outputted from the SFP 8.

A receiving-side SerDes module 208 receives the electrical physical layer serial signal 12 from the SFP 8. The receiving-side SerDes module 208 is positioned on the receiver side of the improved ultra-low latency communication device 200 and performs de-serialisation of the incoming electrical physical layer serial signal 12 to output an incoming electrical physical layer parallel signal 216. The SerDes module 208 is implemented to have a low latency, such as being implemented using programmable logic. The SerDes module 208 operates as a de-serializer module within the improved FPGA-implemented ultra-low latency communication device 200.

It will be appreciated that the SerDes module 208 is illustrated in the example as a standalone module. That is, the SerDes module 208 is not provided as a module that is embedded within a component that also performs various other data/signal conversion/processing modules.

According to various embodiments, an electrical conversion is applied to the electrical physical layer serial signal 12 outputted from the SFP 8 before that signal is received at the SerDes module 208. The outputted electrical physical layer serial signal 12 may be in CML signal format and a conversion to LVDS is applied by an LVDS converter 224 prior to being inputted to the SerDes module 208. This conversion may be carried out by electrical buffers to provide the LVDS converter 224 with a very low latency (e.g., latency of less than 1 ns).

It will be appreciated that the SerDes module 208 receives the incoming electrical physical layer serial signal 12 directly from the SFP 8 (which is an optical fiber transceiver). That is, the SerDes module 208 receives the incoming electrical physical layer serial signal 12 without any intermediate modules being located therebetween that substantially contribute to increase latency. For example, while the LVDS converter 224 is located between the SFP 8 and the SerDes module 208, it has a very low latency compared to the total round-trip latency of the improved FPGA-implemented ultra-low latency communication device 200. More particularly, a clock recovery module is not located on the signal path between the SFP 8 and the SerDes module 208 (i.e., this signal path is free of a clock recovery module).

According to various example embodiments, the SerDes module 208 is configured to be driven by a clock signal that is synchronized to the incoming electrical physical layer serial signal 12. This synchronized clock signal is not extracted by the SFP 8 when outputting the incoming electrical physical layer serial signal 12. Since the synchronized clock signal is not extracted, the incoming electrical physical layer serial signal 12 received directly by the SerDes module 208 is unusable by this SerDes module 208 for driving the SerDes module 208 when performing de-serialization of the incoming electrical physical layer serial signal 12 to output an incoming electrical physical layer parallel signal 216.

The improved ultra-low latency communication device 200 includes a clock recovery module 232 that is configured to receive the incoming electrical physical layer serial signal 12 and recover the synchronizing clock signal embedded therein, which is outputted as the recovered clock signal 236.

The recovered clock signal 236 is fed to a receiving-side phase lock loop module 240, which up-converts the recovered clock signal 236 according to the expected frequency of serial bits of the electrical physical layer serial signal 12 and the serialization (de-serialization) ratio applied at the SerDes module 208. The up-converted clock signals generated based on the recovered clock signal is outputted by the phase lock loop module 240 as receiving-side driving signals 242, 244 to drive the receiving-side SerDes module 208 and other components on the receiving side.

A delay element 246 is provided between the SFP 8 and the input of the SerDes module 208 to synchronize the electrical physical layer serial signal 12 with the receiving-side driving signal 242, 244. For example, the delay element 246 adjusts a phase of the electrical physical layer serial signal 12 received at the SerDes module 208.

The recovery of the synchronizing clock signal by the clock recovery module 232 may be carried out in parallel with the de-serialization of the incoming electrical physical layer serial signal 12 by the SerDes module 208. That is, while the SerDes module 208 performs de-serialization of the incoming electrical physical layer serial signal 12, the clock recovery module 232 performs recovery of the synchronizing clock signal at substantially the same time. It will be understood that the updating of the recovered synchronizing clock signal occurs very slowly relative to the data rate of incoming data signal (e.g., the recovered synchronizing clock signal is determined based on an average of metrics from hundreds or thousands of data periods, or more, and the refresh rate of the recovered synchronizing clock signals is on the order of milliseconds or slower). Accordingly, using a recovered synchronizing clock signal that is obtained in parallel with the performing of the de-serialization does not substantially affect the accuracy or the timing of the de-serialization. By having the SerDes module 208 and the clock recovery module 232 operate in parallel, the latency contributed by the combination of these two modules is equivalent to the slowest (i.e., having the longest latency) of the two modules. Typically, this will be the SerDes module 208. Accordingly, the latency contributed by these two modules within a round-trip latency of the improved ultra-low latency communication device 200 is substantially equal to a latency of the SerDes module 208.

According to one example embodiment, and as illustrated, the improved ultra-low latency communication device 200 includes a prefabricated transceiver 16, as described elsewhere herein, and the clock and data recovery and de-serializer module 232 of the transceiver 16 is used as the clock recovery module 232. As illustrated in FIGS. 1-2, the clock and data recovery and de-serializer module 24 may be implemented as a unitary module. The recovery of the synchronizing clock signal is performed after the electrical physical layer serial signal 12 has been processed by the PMA interface module 20.

It will be understood that that clock and data recovery and de-serializer module 24 is used principally, or exclusively, for recovering the synchronizing clock signal of the electrical physical layer serial signal 12. Any de-serializing performed by the module 24 is not used further within the improved ultra-low latency communication device 200. Accordingly, the SerDes module 208 is discrete from the prefabricated transceiver 16. The de-serializer portion of the clock and data recovery and de-serializer module 24 is bypassed by the SerDes module 208 when the SerDes module 208 is operated to convert the incoming electrical physical layer serial signal 12 to output the incoming electrical physical layer parallel signal 216.

According to various example embodiments, and as illustrated, the SerDes module 208 applies a de-serialization ratio that is different from the de-serialization ratio applied by the clock and data recovery module 24 of the prefabricated transceiver 16. For example, the SerDes module 208 applies a deserialization ratio that is lower (i.e., less parallel bits in the de-serialized signal) than the de-serialization ratio of the clock and data recovery module 24. The de-serialization ratio of the SerDes module 208 may be less than the minimum de-serialization ratio of the prefabricated transceiver 16. This has the effect of each clock period of each group of parallel bits outputted from the SerDes module 208 being shorter in duration than each clock period of each group of parallel bits that would have otherwise been outputted by the clock and data recovery and deserialization module 24 of the receiving side prefabricated transceiver 16.

In the example illustrated in FIG. 2, the electronic data contained on the incoming electrical physical layer serial signal 12 is transmitted at a data rate of 1.25 Gbps, which gives a per bit frequency of 1.25 GHz. The clock and data recovery module 24 of the prefabricated transceiver 16 has a de-serialization ratio of 1:16 (as provided elsewhere herein, for certain models of transceivers, such as the Xilinx UltraScale™ GTY, 16 bits is the minimum width of the clock and data recovery module 24). As a result, the recovered clock signal 236 has a frequency of 78.125 MHz. The illustrated SerDes module 208 implements a de-serialization ratio of 1:4. The recovered clock signal 236 is upconverted by the phase lock loop 240 to output a first driving signal 242 having an effective frequency of 1.25 GHz and a second driving signal 244 having a frequency of 312.5 MHz. It will be appreciated that 312.5 MHz, which is a quarter of 1.25 GHz, corresponds to the period of each cycle of each 4-bit electrical physical layer parallel signal 216 outputted from the SerDes module 208. The effective frequency of 1.25 GHz of the first driving signal 242 may be obtained by having an actual frequency of 625 MHz and using both the rising and falling edges of the signal to drive the SerDes module 208.

As illustrated, the incoming electrical physical layer parallel signal 216 is received at the FPGA fabric 56 and processed by the receiving-side PCS module 60 and the receiving-side MAC module 64. As described elsewhere herein, the receiving-side PCS module 60 applies physical code sublayer processing according to Ethernet standards. The receiving-side MAC module 64 provides interfacing of the FPGA fabric 56 with a multiple access network, and outputs an incoming data-link layer parallel signal 248 having the same bit-width (e.g., 4 bits) as the electrical physical layer parallel signal 216.

As illustrated the PCS module 60 and the MAC module 64 of the FPGA fabric 56 are driven by the second receiving-side driving signal 244 outputted from the phase lock loop 240. It will be appreciated that the PCS module 60 and MAC module 64 on the receiving side are driven by a driving signal (signal 244) that has a frequency determined according to a data rate of the incoming electrical physical layer serial signal (which may be equal to the frequency of the recovered clock signal, e.g., 1.25 GHz) and the de-serialization ratio applied at the SerDes module 208 (e.g., ratio of 1:4). This may cause the PCS module 60 and MAC module 64 to have a higher frequency (e.g., 312 MHz) than if components of the prefabricated transceiver were to be wholly used to drive the receiving-side PCS module 60 and MAC module 64.

On the transmission side, transmitting-side MAC module 88 receives an outgoing data link layer signal 250 that has been outputted after logical processing (e.g. applying financial trading algorithms). A transmitting side PCS module 92 converts the data link layer signal to an outgoing electrical physical layer parallel output signal 252. This outgoing electrical physical layer parallel signal 248 is serialized by a transmitting side SerDes module 256 operating in serialization mode. The transmitting-side SerDes module 256 is implemented to have a low latency, such as being implemented using programmable logic.

A transmitting side phase lock loop 264 provides the transmitting driving clock signals 266, 268 for the PCS module 92, MAC module 88 and the transmitting side SerDes module 256. The transmitting side phase lock loop 264 is internal to the improved ultra-low latency communication device 200 and clock recovery is not required.

In some example embodiments, and since clock recovery is not required, the transmitting-side phase lock loop 264 can be independent of the receiving side phase lock loop 240. For example, the transmitting-side phase lock loop 264 can be non-synchronized with the clock signals of the receiving-side phase lock loop 240. It will be appreciated that due to serialization being provided on the transmission side by the SerDes module 256, the transmitting side of the improved ultra-low latency communication device 24 is free of (does not include) a prefabricated transceiver.

Since data is transmitted from the SFP 8 at the same rate (e.g., 1.25 Gbps) as data is received, the transmitting-side phase lock loop 264 may output driving signals 266, 268 having the same clock frequencies as the receiving-side driving signals 242, 244 outputted from the receiving-side phase lock loop 240. Furthermore, the transmitting-side SerDes module 256 can have the same serialization ratio as the de-serialization ratio of the receiving side SerDes module 240.

In the illustrated example, the parallel signal 250 processed by the transmitting-side MAC module 88 and PCS module 92 are also 4-bit parallel signals and the transmitting-side SerDes module 256 also applies a serialization ratio of (4:1). Furthermore, the transmitting-side phase lock loop 240 also outputs a first driving signal 266 corresponding to the effective frequency of the serial bits outputted from the transmitting-side SerDes (e.g. 1.25 GHz) and a second driving signal 268 corresponding to the frequency of each group of 4 bits of the parallel signal (ex: 312.5 Mhz), which further drives the transmitting-side MAC module 92 and the transmitting-side PCS module 88.

The transmitting-side SerDes module 256 may output an outgoing electrical physical layer serial signal 272 in LVDS, which may be converted at transmitting-side converter 280, prior to being received at the SFP 8.

It was observed that the improved ultra-low latency communication device 200 illustrated in FIG. 2 exhibits lower round-trip latency than the ultra-low latency communication device 1 implemented using prefabricated transceivers illustrated in FIG. 1.

A first reduction in latency is achieved by using the receiving-side SerDes module 208 to provide de-serializing of the physical layer serial signal 12. The latency of the SerDes module 208 is substantially lower than the latency of the receiving-side prefabricated transceiver 16 (each of the PMA module 20, clock and data recovery and de-serializer module 24, PCS bypass module 28 and fabric interface module 32 of the prefabricated receiving side transceiver 16 contribute to the latency). While the prefabricated transceiver 16 may be used to perform clock recovery, it will be appreciated that the clock recovery is performed in parallel to the conversion performed by the SerDes module 208 and is not contributory to the latency. Accordingly, the prefabricated transceiver 16 that provides the clock recovery is bypassed by the de-serializer module 208 when converting the incoming electrical physical layer signal 12 to an incoming electrical physical layer parallel signal 216.

A second reduction in latency is achieved by using a de-serialization ratio at the receiving side SerDes module 208 that is less than the minimum de-serialization ratio of the de-serializer module 232 of the pre-fabricated transceiver 16. This reduces the clock period of each set of parallel bits of the incoming electrical physical layer parallel input signal 216, and increases the clock frequency at which the PCS module 56 and MAC module 64 are driven. In the illustrated examples, whereas the PCS module 56 and MAC module 64 are driven at 78.125 MHz in the device 1 of FIG. 1, they are driven four times faster at 312.5 MHz in the improved device 200 of FIG. 2. It was further observed that the 312.5 MHz clock for driving the PCS module 56 and MAC module 64 is within a range of 250 MHz to 350 MHz that provides for improved low latency use of these modules 56, 64.

On the receiving side, the addition of the LVDS convertor 224, receiving-side SerDes module 208 (latency of <20 ns), and delay element 246 contribute to the latency within the receiving-side signal path, but these contributions are offset by reductions in latency described above. For example, on the receiving-side, the contributors of latency essentially consist of the SFP 8, the LVDS convertor 224, the delay element 246, the receiving-side SerDes module 208, the receiving-side PCS module 60 and the receiving-side MAC module 64.

On the transmitting side, a third reduction in latency is achieved by also applying a serialization ratio at the transmitting-side SerDes module 256 that is less than the minimum de-serialization ratio of the de-serializer module 232 of the pre-fabricated transceiver 100. Accordingly, the transmitting-side MAC module 92 and PCS module 56 are also driven at an increased clock frequency. In the illustrated example FIG. 2, they are also driven at a frequency of 312.5 MHz.

A fourth reduction in latency is achieved by entirely omitting the transmitting-side prefabricated receiver 100 and using the transmitting side SerDes module 256 to carry out the serialization. For example, on the transmitting-side, the contributors of latency essentially consist of the transmitting-side MAC module 88, the transmitting-side PCS module 92, the transmitting-side SerDes module 256, the LVDS module 280 and the SFP 8.

It was further observed that the improved ultra-low latency communication device 200 illustrated in FIG. 2 can achieve a round trip latency that is substantially lower than 70 ns.

According to some example embodiments, an SFP may be connected to at least two FPGA-implemented ultra-low latency communication devices, with an analog switch (e.g., multiplexer) providing the switching between the two FPGA devices. One of the FPGA communication devices may be adapted for a lower data-rate link (e.g., 1G) and has the configuration of the improved ultra-low latency communication device 200 described herein with reference to FIG. 2. The other of the FPGA communication devices may be adapted for higher data-rate link (e.g., 10G) and has the configuration of the ultra-low latency communication device 1 implemented using prefabricated transceivers and as described herein with reference to FIG. 1. It was observed that while the improved ultra-low latency communication device 200 substantially reduced latency for the lower data-rate link, the ultra-low latency communication device 1 achieved acceptable latency using the prefabricated transceivers.

As described elsewhere herein, the improved ultra-low latency communication device 200 is useful for various applications related to electronic trading, such as market data feed handler, market data feed distribution systems (e.g., interface to servers using 1G Network Interface Card), Ethernet interfaces speed and protocols converters (e.g., 10G/1G), ultra-low latency switch, and low-latency microwave link Ethernet Gigabit interface.

While various example embodiments are described herein in the context of an optical fiber data link (implementing optical to electrical and electrical to optical conversions via the SFP), it will be understood that the example embodiments may also be applicable to other types of data links, such as microwave, electrical lines, or laser radio. It will be understood that a different type of signal conversion needs to be implemented depending on the type of data link (e.g., the SFP 8 is replaced by a different type of suitable signal converter).

A method for carrying out ultra-low latency communication can include the following steps: receiving an incoming electrical physical layer serial signal; recovering, from the incoming electrical physical layer serial signal, a recovered clock signal; generating receiving-side driving signals based on the recovered clock signal; converting, according to the receiving-side driving signals, the incoming electrical physical layer serial signal to an incoming electrical physical layer parallel signal, the converting of the incoming electrical physical layer serial signal being carried out in parallel with the recovering of the recovered clock signal; processing the incoming electrical physical layer parallel signal to output an incoming data-link layer parallel signal; receiving an outgoing data-link layer parallel signal generated based on electronic information contained in the incoming data-link layer parallel signal; processing the outgoing data-link layer parallel signal to output an outgoing electrical physical layer parallel signal; and converting the outgoing electrical physical layer parallel signal to an outgoing electrical physical layer serial signal.

These steps may be carried out by components of the improved ultra-low latency communication device 200 described herein according to various example embodiments. In one example embodiment, the recovering the recovered clock signal is carried out using a clock recovery module implemented on the prefabricated transceiver module 16 that also implements an embedded de-serializer module. Converting the incoming electrical physical layer serial signal to the incoming electrical physical layer parallel signal is carried out using a de-serializer module being discrete from the prefabricated transceiver module. Accordingly, this converting bypasses the prefabricated transceiver module 16.

Figure 3:
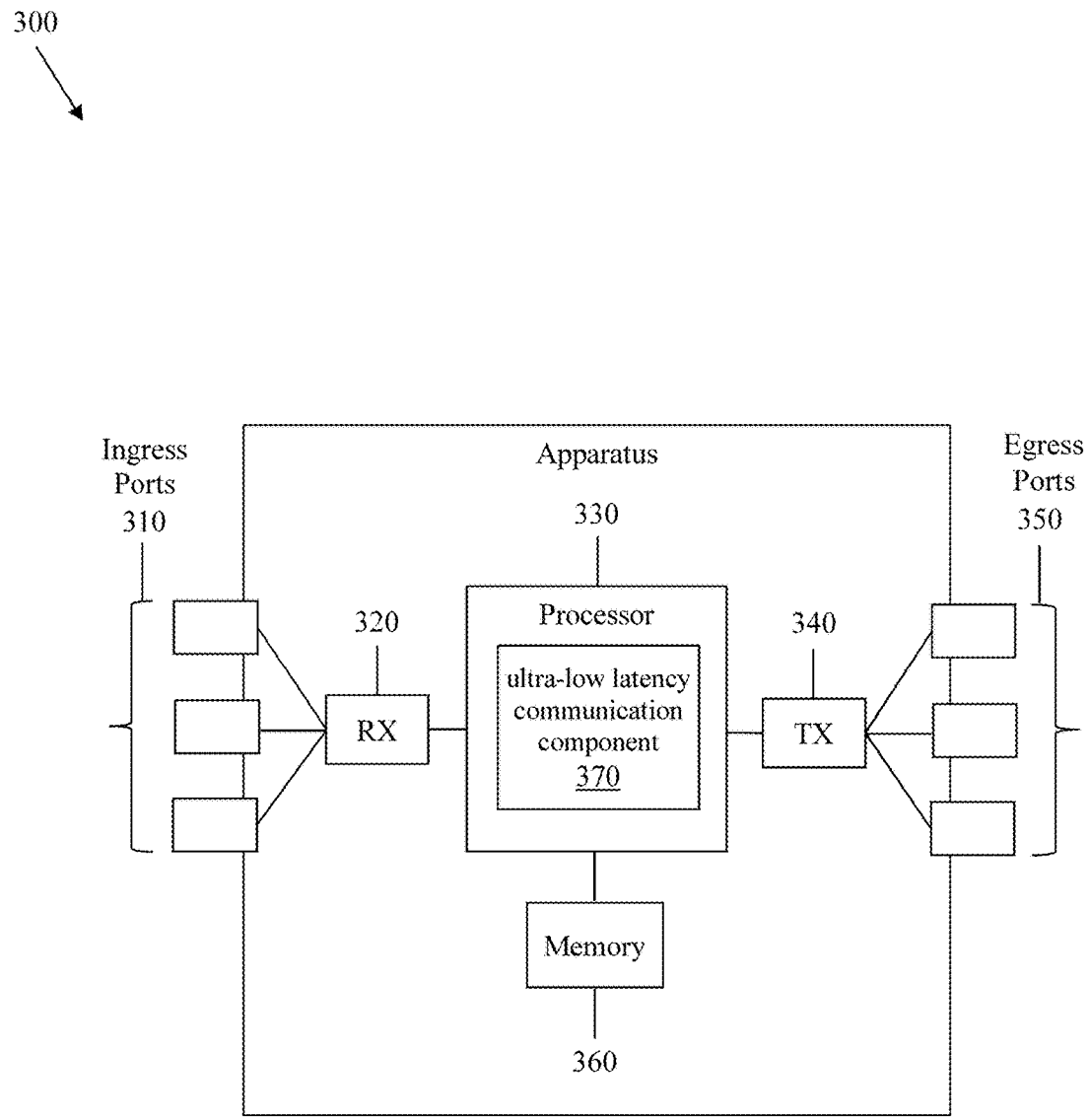
FIG. 3 is a schematic diagram of an apparatus according to an embodiment of the disclosure.

FIG. 3 is a schematic diagram of an apparatus 300 according to an embodiment of the disclosure. The apparatus 300 may implement the disclosed embodiments. The apparatus 300 comprises ingress ports 310 and an RX 320 for receiving data; a processor, logic unit, baseband unit, or CPU 330 to process the data; a TX 340 and egress ports 350 for transmitting the data; and a memory 360 for storing the data. The apparatus 300 may also comprise OE components, EO components, or RF components coupled to the ingress ports 310, the RX 320, the TX 340, and the egress ports 350 for ingress or egress of optical, electrical signals, or RF signals.

The processor 330 is any combination of hardware, middleware, firmware, or software. The processor 330 comprises any combination of one or more CPU chips, cores, FPGAs, ASICs, or DSPs. The processor 330 communicates with the ingress ports 310, the RX 320, the TX 340, the egress ports 350, and the memory 360. The processor 330 comprises an ultra-low latency communication component 370, which implements the disclosed embodiments. The inclusion of the ultra-low latency communication component 370 therefore provides a substantial improvement to the functionality of the apparatus 300 and effects a transformation of the apparatus 300 to a different state. Alternatively, the memory 360 stores the ultra-low latency communication component 370 as instructions, and the processor 330 executes those instructions.

The memory 360 comprises any combination of disks, tape drives, or solid-state drives. The apparatus 300 may use the memory 360 as an over-flow data storage device to store programs when the apparatus 300 selects those programs for execution and to store instructions and data that the apparatus 300 reads during execution of those programs. The memory 360 may be volatile or non-volatile and may be any combination of ROM, RAM, TCAM, or SRAM.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the disclosure as defined in the claims appended hereto.

What is claimed is:

1. An ultra-low latency communication device comprising:
    a clock recovery module configured to:
        receive an incoming electrical physical layer serial signal, and
        recover, from the incoming electrical physical layer serial signal, a recovered clock signal;
    a de-serializer module configured to:
        receive the incoming electrical physical layer serial signal and receiving-side driving signals generated based on the recovered clock signal, and
        convert, according to the receiving-side driving signals, the incoming electrical physical layer serial signal to an incoming electrical physical layer parallel signal;
    a field-programmable gate array (FPGA) fabric configured to:
        receive the incoming electrical physical layer parallel signal,
        process the incoming electrical physical layer parallel signal to output an incoming data-link layer parallel signal,
        receive an outgoing data-link layer parallel signal generated based on electronic information contained in the incoming data-link layer parallel signal, and
        process the outgoing data-link layer parallel signal to output an outgoing electrical physical layer parallel signal; and
    a serializer module configured to:
        receive the outgoing electrical physical layer parallel signal; and
        convert the outgoing electrical physical layer parallel signal to an outgoing electrical physical layer serial signal.

2. The device of claim 1, further comprising an optical fiber transceiver configured to convert an incoming optical signal to the incoming electrical physical layer serial signal, and wherein the de-serializer module is further configured to receive the incoming electrical physical layer serial signal directly from the optical fiber transceiver.

3. The device of claim 2, wherein the incoming electrical physical layer serial signal is unusable by the de-serializer module for driving the de-serializer module to convert the incoming electrical physical layer serial signal to the incoming electrical physical layer parallel signal.

4. The device of claim 2, wherein the clock recovery module is further configured to further recover the recovered clock signal in parallel with the de-serializer module converting the incoming electrical physical layer serial signal.

5. The device of claim 4, wherein a latency contributed by the clock recovery module and the de-serializer module in a round-trip latency of the ultra-low latency communication device is substantially equal to a latency of the de-serializer module.

6. The device of claim 5, wherein the receiving-side driving signals and the transmitting-side driving signals have the same clock frequencies.

7. The device of claim 4, further comprising a prefabricated transceiver module implementing the clock recovery module and comprising an embedded de-serializer module.

8. The device of claim 1, wherein the incoming electrical physical layer serial signal is unusable by the de-serializer module for driving the de-serializer module to convert the incoming electrical physical layer serial signal to the incoming electrical physical layer parallel signal.

9. The device of claim 1, wherein the serializer module is further configured to further convert the outgoing electrical physical layer parallel signal according to transmitting-side driving signals generated independently of the recovered clock signal.

10. The device of claim 9, wherein the receiving-side driving signals are non-synchronized with the transmitting-side driving signals.

11. The device of claim 1, further comprising a prefabricated transceiver module implementing the clock recovery module and comprising an embedded de-serializer module.

12. The device of claim 11, wherein the clock recovery module and the embedded de-serializer module are implemented as a unitary clock and data recovery and de-serializer module within the prefabricated transceiver module, and wherein the unitary clock and data recovery and de-serializer module is configured exclusively to recover the recovered clock signal from the incoming electrical physical layer serial signal.

13. The device of claim 12, wherein the prefabricated transceiver module is bypassed by the de-serializer module when converting the incoming electrical physical layer serial signal to an incoming electrical physical layer parallel signal.

14. The device of claim 11, wherein the de-serializer module applies a de-serialization ratio when converting the incoming electrical physical layer serial signal being less than a minimum de-serialization ratio of the embedded de-serializer module of the prefabricated transceiver module.

15. The device of claim 11, wherein the prefabricated transceiver module is bypassed by the de-serializer module when converting the incoming electrical physical layer serial signal to an incoming electrical physical layer parallel signal.

16. The device of claim 11, wherein the de-serializer module is a standalone module.

17. The device of claim 11, wherein the serializer module is further configured to apply a serialization ratio equivalent to the de-serialization ratio.

18. The device of claim 11, wherein a transmitting side of the communication device is free of a prefabricated transceiver.

19. The device of claim 11, further comprising an FPGA, wherein the prefabricated transceiver is instantiated as a hard macro on the FPGA, and wherein the FPGA fabric is implemented on the FPGA.

20. The device of claim 1, wherein the FPGA fabric comprises a receiving-side physical coding sublayer (PCS) module and a receiving-side medium access control (MAC) module, each being driven by a driving signal having a frequency determined according to a data rate of the incoming electrical physical layer serial signal and a de-serialization ratio applied at the de-serializer module.

21. A method comprising:
  receiving an incoming electrical physical layer serial signal;
  recovering, from the incoming electrical physical layer serial signal, a recovered clock signal;
  generating receiving-side driving signals based on the recovered clock signal;
  converting, according to the receiving-side driving signals, the incoming electrical physical layer serial signal to an incoming electrical physical layer parallel signal, the converting of the incoming electrical physical layer serial signal being carried out in parallel with the recovering of the recovered clock signal;
  processing the incoming electrical physical layer parallel signal to output an incoming data-link layer parallel signal;
  receiving an outgoing data-link layer parallel signal generated based on electronic information contained in the incoming data-link layer parallel signal;
  processing the outgoing data-link layer parallel signal to output an outgoing electrical physical layer parallel signal; and
  converting the outgoing electrical physical layer parallel signal to an outgoing electrical physical layer serial signal.

22. The method of claim 21, wherein recovering the recovered clock signal is carried out using a clock recovery module implemented on a prefabricated transceiver module that also implements an embedded de-serializer module, wherein converting the incoming electrical physical layer serial signal to the incoming electrical physical layer parallel signal is carried out using a de-serializer module being discrete from the prefabricated transceiver module, and wherein the converting bypasses the prefabricated transceiver module.

* * * * *